United States Patent
Kamath

(10) Patent No.: US 10,432,086 B1
(45) Date of Patent: Oct. 1, 2019

(54) METHODS AND SYSTEMS OF BRIDGELESS PFC CONVERTERS

(71) Applicant: SEMICONDUCTOR COMPONENTS INDUSTRIES, LLC, Phoenix, AZ (US)

(72) Inventor: Nikhilesh S. Kamath, Chandler, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/359,426

(22) Filed: Mar. 20, 2019

Related U.S. Application Data

(60) Provisional application No. 62/655,592, filed on Apr. 10, 2018.

(51) Int. Cl.
*H02M 7/42* (2006.01)
*H02M 1/42* (2007.01)
*H02M 7/12* (2006.01)

(52) U.S. Cl.
CPC ........... *H02M 1/4225* (2013.01); *H02M 7/12* (2013.01)

(58) Field of Classification Search
CPC .... H02M 1/4225; H02M 1/4208; H02M 7/12; H02M 7/217; H02M 1/12; H02M 1/14; H02M 1/15; H02M 1/42; G05B 11/016; G05B 1/52
See application file for complete search history.

(56) References Cited

U.S. PATENT DOCUMENTS

| 10,193,437 B1* | 1/2019 | Hari | H02M 1/4208 |
| 2010/0259957 A1* | 10/2010 | Jin | H02M 1/4208 363/126 |
| 2012/0293141 A1* | 11/2012 | Zhang | H02M 1/4233 323/207 |

(Continued)

OTHER PUBLICATIONS

Firmansyah, Eka et al., "Totem-Pole Power-Factor-Correction Converter under Critical-Conduction-Mode Interleaved Operation," IEICE Trans. Commun., vol. E93-B, No. 9, Sep. 2010, 7 pages, Copyright 2010 The Institute of Electronics, Information and Communication Engineers.

(Continued)

*Primary Examiner* — Adolf D Berhane
(74) *Attorney, Agent, or Firm* — Dickinson Wright PLLC; Mark E. Scott

(57) ABSTRACT

Bridgeless PFC converters. At least some example embodiments are methods of operating a power converter, including operating the power converter during a positive half-line cycle of a frequency of an alternating current (AC) source by: charging a primary winding of a multi-winding boost inductor with a charging current having a first polarity; and then discharging the primary winding; sensing a falling edge of a voltage at a switch node by way of a secondary winding of the multi-winding boost inductor; and triggering a subsequent charging of the primary winding during the positive half-line cycle based on the falling edge. Operating the power converter during a negative half-line cycle of the line frequency by: sensing a rising edge of the voltage at the switch node by way of the secondary winding; and triggering a subsequent charging of the primary winding.

20 Claims, 10 Drawing Sheets

(56) References Cited

U.S. PATENT DOCUMENTS

| | | | |
|---|---|---|---|
| 2013/0257392 A1* | 10/2013 | Yan | H02M 1/4233 |
| | | | 323/210 |
| 2014/0035541 A1* | 2/2014 | Jin | G05F 1/70 |
| | | | 323/210 |
| 2014/0355319 A1* | 12/2014 | Cohen | H02M 7/217 |
| | | | 363/126 |
| 2018/0062504 A1* | 3/2018 | Mei | G05F 1/70 |

OTHER PUBLICATIONS

"Totem-Pole Bridgeless PFC Design Using MC56F82748," NXP Semiconductors, Design Reference Manual, Rev. 0, Document No. DRM174, Nov. 2016, 43 pages, Copyright 2016 NXP B.V.

Zhou, Bo, "CCM Totem-Pole Bridgeless PFC with Ultra-Fast IGBT," Thesis Paper, Nov. 25, 2014, Blacksburg, VA, 93 pages, Copyright 2014, Bo Zhou.

* cited by examiner

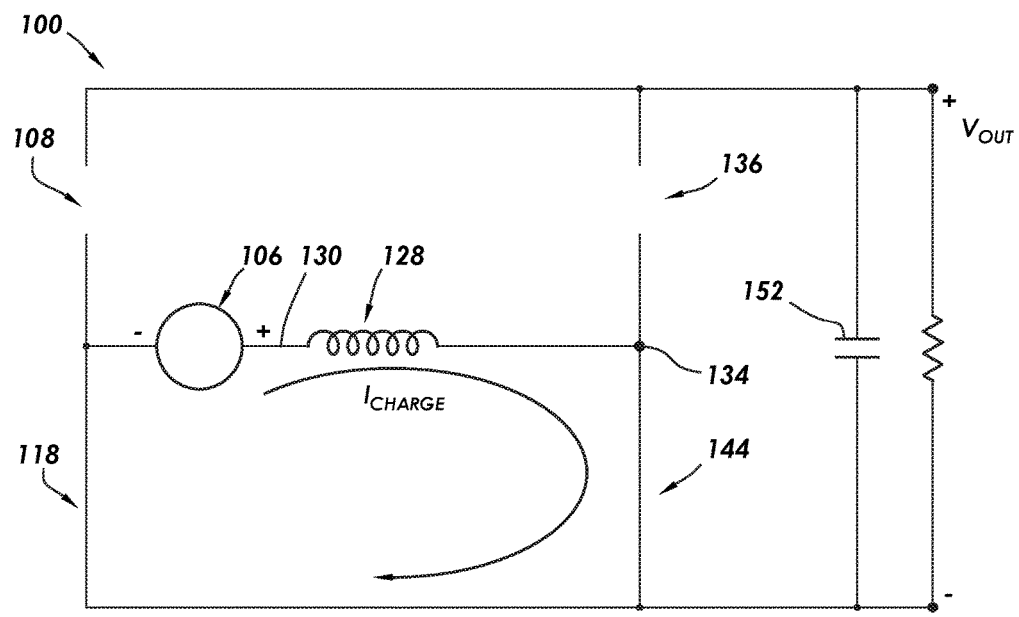
FIG.2
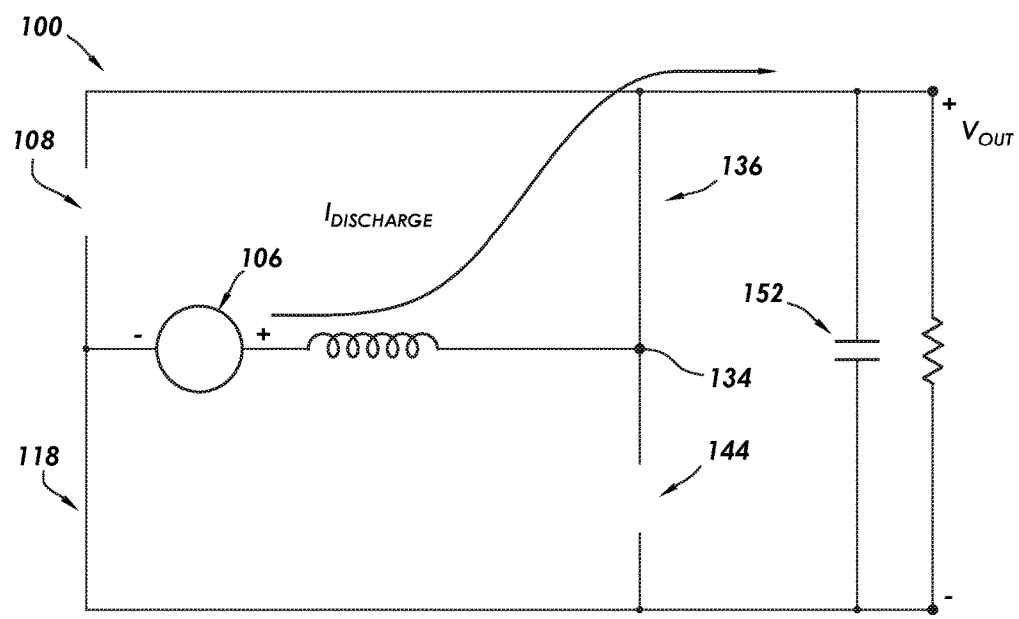
FIG.3

US 10,432,086 B1

METHODS AND SYSTEMS OF BRIDGELESS PFC CONVERTERS

CROSS-REFERENCE TO RELATED APPLICATIONS

This application claims the benefit of U.S. Provisional Application No. 62/655,592 filed Apr. 10, 2018 titled "Valley Detection For Totem Pole Bridgeless PFC." The provisional application is incorporated by reference herein as if reproduced in full below.

BACKGROUND

There is an ever increasing demand for power converters with better efficiency and smaller footprint. Recent attention in meeting the noted demands has focused on the rectifying bridge, and particular advances in bridgeless power factor correcting (PFC) converters. One of the difficulties in such designs is detecting and switching in such a way as to reduce switching losses. Any method or system that improves the detecting and switching would provide a competitive advantage in the marketplace.

BRIEF DESCRIPTION OF THE DRAWINGS

For a detailed description of example embodiments, reference will now be made to the accompanying drawings in which:

FIG. 2 shows an electrical schematic of a bridgeless PFC converter during a positive half-line cycle and during charging of the inductance, in accordance with at least some embodiments;

FIG. 3 shows an electrical schematic of a bridgeless PFC converter during a positive half-line cycle and during discharging of the inductance, in accordance with at least some embodiments;

DEFINITIONS

Figure 1:
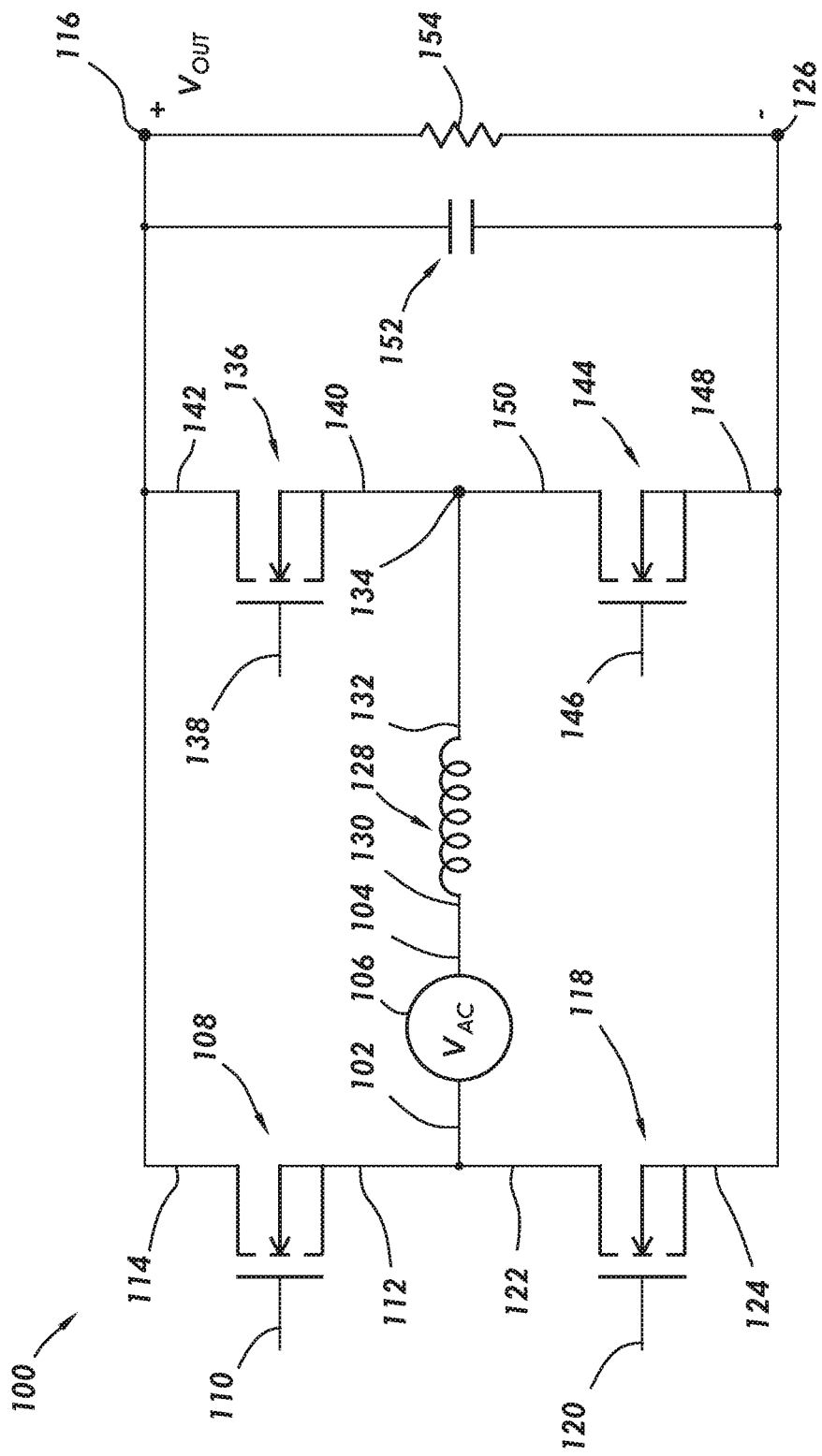
FIG. 1 shows a bridgeless power factor correcting (PFC) converter in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Controller" shall mean individual circuit components, an application specific integrated circuit (ASIC) constructed, a microcontroller (with controlling software), a field programmable gate array (FPGA), or combinations thereof, configured to read signals and take action responsive to such signals.

In relation to electrical devices, the terms "input" and "output" refer to electrical connections to the electrical devices, and shall not be read as verbs requiring action. For example, a controller may have a gate output and one or more sense inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to methods and systems of bridgeless power factor correction (PFC) converters (sometimes referred to as totem-pole bridgeless PFCs). More particularly, example embodiments are directed to methods of operating bridgeless PFCs in such a way as to reduce switching losses by detecting peaks and valleys in an oscillating voltage at a switch node with a simplified and consistent set of components. For example, during positive half-line cycles of an alternating current (AC) source, valleys in the oscillating voltage on a switch node are sensed by a comparator. During negative half-line cycles of the AC source, the same comparator is used to sense peaks of the oscillating voltage. More particularly still, in example embodiments a single comparator and a secondary winding of a multi-winding boost inductor are used to detect both falling edges of the oscillating voltage (for valley detection), and rising edges of the oscillating voltage (for peak detection). The detected falling and rising edges are used to trigger reduced voltage switching for the converter. The specification first turns to an example bridgeless PFC converter to orient the reader.

FIG. 1 shows a bridgeless PFC converter in accordance with at least some embodiments. In particular, FIG. 1 shows a bridgeless PFC converter 100 defining a first line input 102 and a second line input 104. An AC source 106 couples to the line inputs 102 and 104. In some cases, the AC source has a line frequency of 50 or 60 Hertz, and root mean square (RMS) voltages ranging from about 85 to about 265 $V_{RMS}$. The bridgeless PFC converter 100 further defines a slow leg high-side field effect transistor (FET) 108 defining a gate 110, a source 112 coupled to the first line input 102, and a drain 114 coupled to a positive output 116 of the converter 100. The bridgeless PFC converter 100 further defines a slow leg low-side FET 118 defining a gate 120, a drain 122 coupled to the first line input 102, and a source 124 coupled to a negative output 126. The slow leg high-side FET 108 is named based on its location in the drawing (e.g., upper portion), the fact that the slow leg high-side FET 108 is switched based on the line frequency of the AC source 106, and the fact that making slow leg high-side FET 108 fully conductive may involve driving the gate 110 to a voltage slightly higher than an output voltage $V_{OUT}$ of the converter. The slow leg low-side FET 118 is named based on its opposite location from slow leg high-side FET 108 within the drawing (e.g., lower portion), and the fact that the slow leg low-side FET 118 is switched based on the line frequency of the AC source 106. The FETs 108 and 118 are examples used in many cases; however, the FETs are representative of any device that may be used as an electrically controlled switch (e.g., transistors, junction transistors, FETs of other types, and silicon controlled rectifiers). In example systems, the positive output 116 and negative output 126 define the output voltage $V_{OUT}$ of the bridgeless PFC converter 100.

The example bridgeless PFC converter 100 further comprises an inductance 128 that defines a first lead 130 coupled to the second line input 104, and a second lead 132 defining a switch node 134. As will be discussed in greater detail below, in accordance with at least some embodiments the inductance 128 is the primary winding of a multi-winding boost inductor.

The example bridgeless PFC converter 100 further comprises a fast leg high-side FET 136 defining a gate 138, a source 140 coupled to switch node 134, and a drain 142 coupled to the positive output 116. Also included is a fast leg low-side FET 144 defining a gate 146, a source 148 coupled to the negative output 126, and a drain 150 coupled to switch node 134. The fast leg high-side FET 136 is named based on its location in the drawing (e.g., upper portion), the fact that the fast leg high-side FET 136 is switched at a switching frequency higher than the line frequency of the AC source 106, and the fact that making fast leg high-side FET 136 fully conductive may involve driving the gate 138 to a voltage slightly higher than the $V_{OUT}$ of the converter. The fast leg low-side FET 144 is named based on its opposite location from fast leg high-side FET 136 within the drawing (e.g., lower portion), and the fact that the fast leg low-side FET 144 is switched at a switching frequency higher than the line frequency of the AC source 106. The FETs 136 and 144 are examples used in most cases; however, the FETs 136 and 144 are representative of any device that may be used as an electrically controlled switch (e.g., transistors, junction transistors, FETs of other types, and silicon controlled rectifiers).

The example bridgeless PFC controller 100 defines a smoothing or output capacitor 152 coupled across the positive output 116 and the negative output 126. The output capacitor 152 smoothes the output voltage, and stores and provides charge during periods of time when the inductance 128 is in the charge mode (discussed more below). In some cases the output voltage $V_{OUT}$ may be 400 Volts DC across the entire example AC source voltage range of 85 to 265 $V_{RMS}$, but other output voltages are possible. The bridgeless PFC converter 100 thus supplies power to a load coupled across positive output 116 and the negative output 126, with an example load shown as resistor 154. However, in some cases the load may be a further power converter, such as a flyback converter designed and constructed to convert the 400 VDC created by the bridgeless PFC converter to a lower voltage suitable for downstream electronics (e.g., 20 Volts, 12 Volts, or 5 Volts).

Operation of the example bridgeless PFC converter 100 can be conceptually divided into two broad categories: a positive half-line cycle of the AC source 106; and a negative half-line cycle of the AC source 106. In the positive half-line cycle, the AC source 106 has a polarity such that the voltage at the second line input 104 is higher than the first line input 102. Oppositely, in the negative half-line cycle, the AC source 106 has a polarity such that the voltage at the first line input 102 is higher than the voltage at the second line input 104. The designations as "positive" or "negative" are arbitrary, but selected and used consistently to avoid confusion.

During the positive half-line cycle, the slow leg high-side FET 108 is non-conductive and the slow leg low-side FET 118 is conductive. Assuming that the AC source 106 has a line frequency of 60 Hertz, the slow leg high-side FET 108 stays non-conductive in the positive half-line cycle for $\frac{1}{120}$th of a second and the slow leg low-side FET 118 stays conductive for the same $\frac{1}{120}$th of a second. During the negative half-line cycle, the slow leg high-side FET 108 is conductive and the slow leg low-side FET 118 is non-conductive. Assuming again that the AC source 106 has a line frequency of 60 Hertz, the slow leg high-side FET 108 stays conductive in the negative half-line cycle for $\frac{1}{120}$th of a second and the slow leg low-side FET 118 stays non-conductive for the same $\frac{1}{120}$th of a second. The conductive and non-conductive states of the FETs 108 and 118 thus swap back and forth with each polarity change of the voltage of the AC source 106.

Within each conceptual division (e.g., positive half-line cycle and negative half-line cycle), the bridgeless PFC converter 100 has two possible states: charging the inductance 128 (sometimes referred to as charge mode); and discharging the inductance 128 (sometimes referred to a discharge mode). The specification now turns to operation of the bridgeless PFC converter 100 by way of a series of figures. In each figure, FETs that are conductive are shown as short circuits, and FETs that are non-conductive are shown as open circuits.

FIG. 2 shows an electrical schematic of a bridgeless PFC converter during a positive half-line cycle and during charging of the inductance, in accordance with at least some embodiments. In particular, during the positive half-line cycle the slow leg high-side FET 108 is non-conductive (shown as an open circuit), and the slow leg low-side FET 118 is conductive (shown as a short). The example bridgeless PFC converter 100 of FIG. 2 is shown charging the inductance 128, and thus fast leg high-side FET 136 is non-conductive (shown as an open circuit), and fast leg low-side FET 144 is conductive (shown as a short). The configuration shown results in a charging current $I_{CHARGE}$ flowing through the inductance 128, the charging current has a first polarity (e.g., resulting in a positive voltage at the first lead 130 with respect to the switch node 134). Assuming steady state operation, during the charging of the inductance 128, the output voltage $V_{OUT}$ is supplied by the output capacitor 152. The charging current creates and stores energy in the field surrounding the inductance 128. Still during the example positive half-cycle, the bridgeless PFC converter 100 then transitions to discharging the inductance 128.

FIG. 3 shows an electrical schematic of a bridgeless PFC converter during a positive half-line cycle and during discharging of the inductance, in accordance with at least some embodiments. In particular, again during the positive half-line cycle the slow leg high-side FET 108 is non-conductive, and the slow leg low-side FET 118 is conductive. The example bridgeless PFC converter 100 of FIG. 2 is shown discharging the inductance 128, and thus fast leg high-side FET 136 is conductive (shown as a short), and fast leg low-side FET 144 is non-conductive (shown as an open circuit). Because the current through inductance cannot change instantaneously, when the bridgeless PFC converter 100 transitions to discharging the inductance 128, a discharge current $I_{DISCHARGE}$ flows through the inductance 128, and the discharging current has the first polarity. More particularly, the discharge current $I_{DISCHARGE}$ flows to the first lead of the output capacitor 152 and/or the positive output 116 of the output voltage $V_{OUT}$. Thus, during the discharge mode the discharge current $I_{DISCHARGE}$ supplies the output voltage and current, and re-charges the output capacitor 152.

During the example positive half-line cycle, the bridgeless PFC converter 100 switches back and forth between the charge mode and discharge mode to supply the output voltage $V_{OUT}$. More particularly, example embodiments operate the bridgeless PFC converter 100 in a mode where the discharge current $I_{DISCHARGE}$ reaches zero before the next charge mode begins. In some cases the mode is a discontinuous conduction mode (DCM) where the current through the inductor may be zero for an extended period of time, and in other cases the mode is a critical conduction mode (CRM) where a subsequent charging mode begins as soon as the discharge current $I_{DISCHARGE}$ reaches zero. When operated in a discontinuous conduction mode, the switching frequency associated with switching between the charge and discharge modes is dependent upon the amount of power supplied to the load as the valley in which switching takes place varies with the load, and may range from about 50 kilohertz (kHz) to about 500 kHz. When the bridgeless PFC converter 100 is supplying higher power (e.g., 300 to 500 Watts or more), the inductance may be operated in a continuous conduction mode in which valley detection is not used. The switching frequency in the continuous conduction mode is fixed and the duty cycle adjusted to reach a set point peak charging current $I_{CHARGE}$.

Still considering the example positive half-line cycle of FIGS. 2 and 3, the inductance 128, fast leg high-side FET 136 and fast leg low-side FET 144 thus form a non-isolated boost converter, boosting the voltage of the AC source 106 to create the output voltage $V_{OUT}$.

Figure 4:
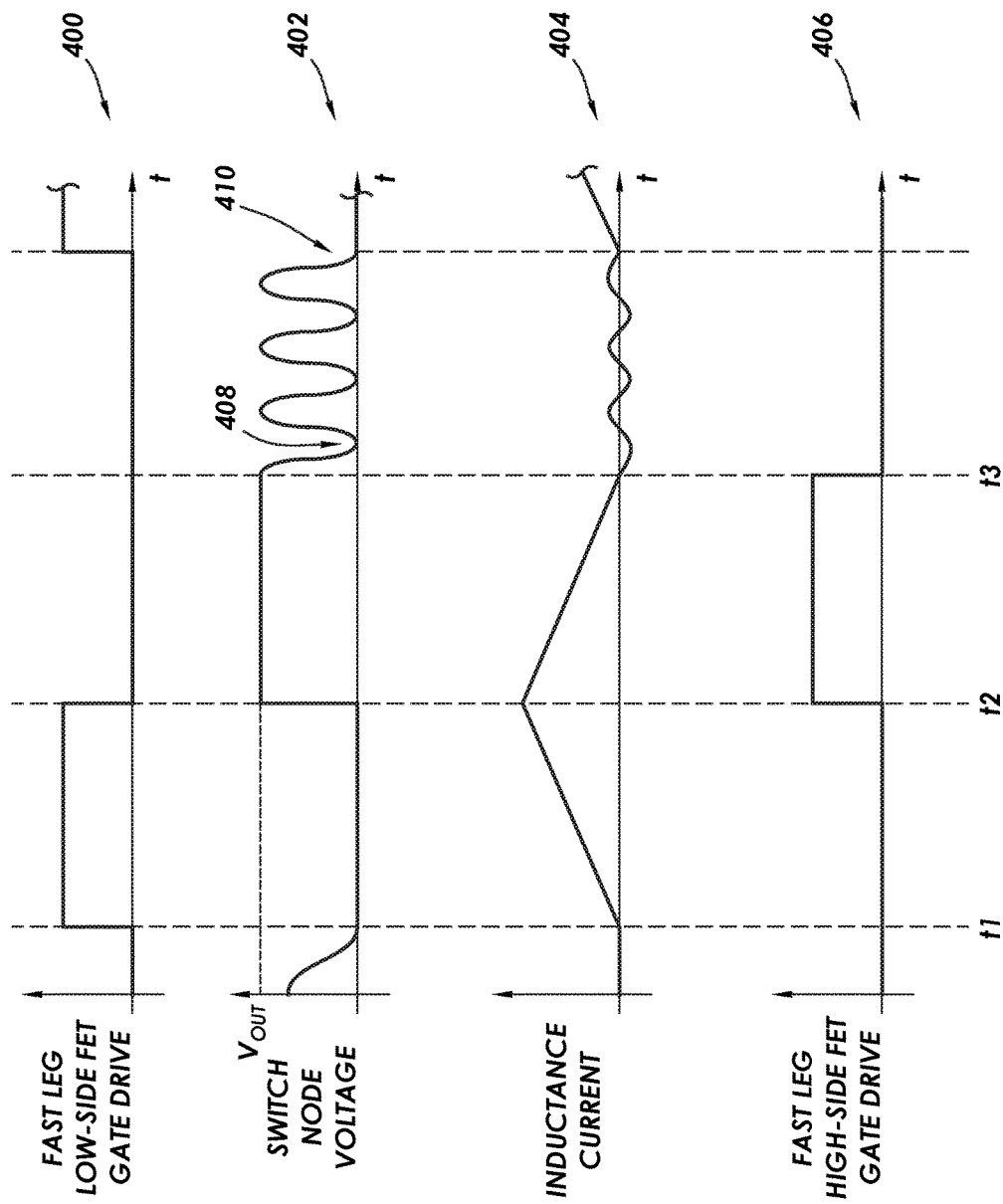
FIG. 4 shows a timing diagram in accordance with at least some embodiments.

FIG. 4 shows a timing diagram in accordance with at least some embodiments. The time scale in FIG. 4 is not necessarily to scale. In particular, plot 400 shows a signal applied to the gate 146 of the fast leg low-side FET 144 (FIG. 1) over about 1.5 cycles of the switching frequency (and during the example positive half-line cycle). Plot 402 shows voltage at the switch node 134 during a corresponding time. Plot 404 shows current through the inductance during a corresponding time. Plot 406 shows a signal applied to the gate 138 of the fast leg high-side FET 136 (FIG. 1) during a corresponding time. In particular, FIG. 4 assumes a discontinuous current mode of the current through the inductance 128 (FIG. 2, 3), and thus prior to time t1 the inductor current is effectively zero. However, in the other cases the bridgeless PFC converter works in a critical conduction mode. Prior to time t1 the switch node voltage is oscillating (discussed more below).

At time t1, the example bridgeless PFC converter (in the example positive half-line cycle) enters the charge mode by asserting the gate 146 of the fast leg low-side FET 144 (plot 400). With the fast leg high-side FET 136 non-conductive and the fast leg low-side FET 144 conductive, the switch node 134 voltage goes to approximately zero (plot 402), and a charging current $I_{CHARGE}$ with a first polarity flows in the inductance 128 (plot 404). The charging current $I_{CHARGE}$ builds linearly. When the charging current $I_{CHARGE}$ reaches a predetermined current threshold (which can be measured or estimated) at time t2, the example bridgeless PFC converter transitions to the discharge mode. Thus, the example charge mode is thus defined between times t1 and t2.

At time t2, the bridgeless PFC converter (still in the example positive half-line cycle) enters the discharge mode by de-asserting the gate 146 of the fast leg low-side FET 144 (plot 400) and simultaneously asserting the gate 138 of the fast leg high-side FET 136 (plot 406). In practice, in order to avoid cross conduction through FETs 136 and 144 (thus shorting the output voltage $V_{OUT}$), the de-assertion of the gate 146 of the fast leg low-side FET 144 is followed by a short blanking time before the gate 138 of the fast leg high-side FET 136 is asserted. With the fast leg high-side FET 136 conductive and the fast leg low-side FET 144 non-conductive, the switch node 134 rises to the output voltage (plot 402), and a discharge current $I_{DISCHARGE}$ flows in the inductance 128 again having the first polarity (plot 404). The discharge current $I_{DISCHARGE}$ falls linearly. The discharge current $I_{DISCHARGE}$ supplies the output voltage and current, and re-charges the output capacitor 152. When the discharge current $I_{DISCHARGE}$ reaches zero at time t3, the fast leg high-side FET 136 is made non-conductive by de-asserting gate 138.

In example embodiments the discharge current $I_{DISCHARGE}$ reaches zero before the next charge mode begins. In FIG. 4, the discharge current $I_{DISCHARGE}$ reaches zero at time t3. At the point in time when the discharge current $I_{DISCHARGE}$ reaches zero, the voltage at the switch node 134 begins to oscillate (plot 402) based on the interaction of the inductance 128 and the capacitance at the switch node 134. The current through the inductance 128 similarly begins to oscillate (plot 404). The oscillation frequency shown in FIG. 4 is exaggerated for clarity, but note that the switch node voltage (plot 402) oscillates within a range of voltages between zero volts and the output voltage $V_{OUT}$. As will be discussed in greater detail below, example bridgeless PFC converters are operated (in the example positive half-line cycle) such that an immediately subsequent charge mode begins in a voltage valley when the voltage across the fast leg low-side FET 144 is below a predetermined voltage threshold. Equivalently stated, the example bridgeless PFC converters are operated (in the example positive half-line cycle) such that an immediately subsequent charge mode begins when voltage across the fast leg low-side FET 144 is at a reduced voltage, which may occur at a minima in the voltage oscillation at the switch node 134. In situations where the bridgeless PFC converter is supplying high power (e.g., 500 Watts or more), the immediately subsequent charge mode may begin in the first valley 408 of the oscillation of the voltage of the switch node 134 (plot 402). In situation where the bridgeless PFC converter is supplying low power (e.g., less than 300 Watts), the immediately subsequent charge made may begin in the Nth valley (e.g., fourth valley 410), where the N is selected based on a value indicative of power provided to the load.

FIGS. 2, 3, and 4 are all with respect to the positive half-line cycle of the frequency of the AC source 106. More precisely, during periods of time when the voltage impressed on the second line input 104 by the AC source 106 is higher than the voltage impressed on the first line input 102. The specification now turns to the negative half-line cycle; or more precisely, the specification now turns to periods of time when the voltage impressed on the first line input 102 by the AC source 106 is higher than the voltage impressed on the second line input 104.

Figure 5:
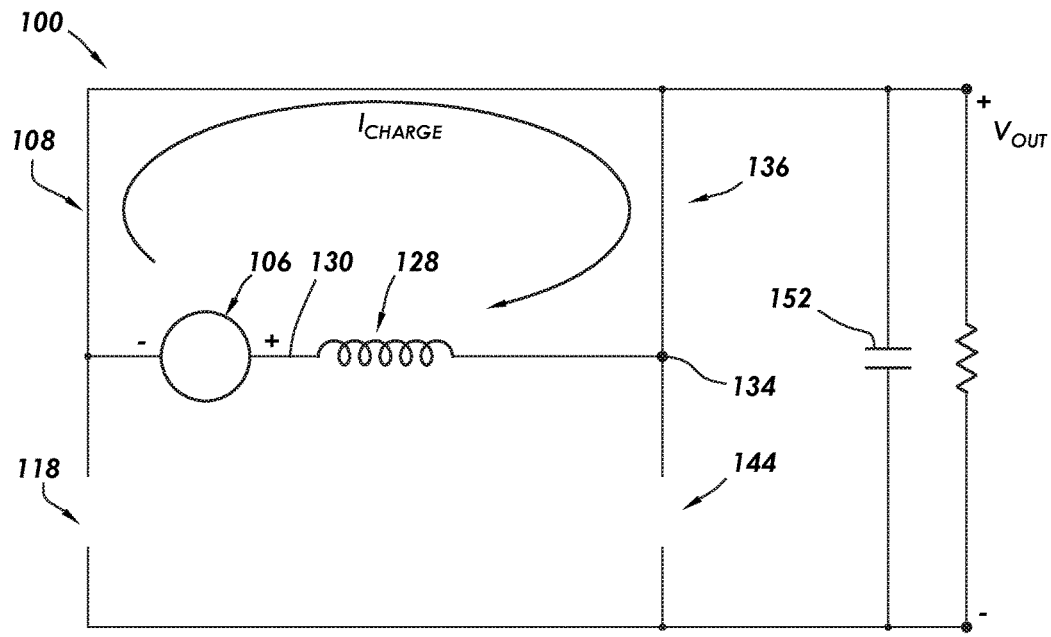
FIG. 5 shows an electrical schematic of a bridgeless PFC converter during a negative half-line cycle and during charging of the inductance.

FIG. 5 shows an electrical schematic of a bridgeless PFC converter during a negative half-line cycle and during charging of the inductance, in accordance with at least some embodiments. In particular, during the negative half-line cycle the slow leg high-side FET 108 is conductive (shown as a short), and the slow leg low-side FET 118 is non-conductive (shown as an open circuit). The example bridgeless PFC converter 100 of FIG. 5 is shown charging the inductance 128 (i.e., the charge mode), and thus fast leg high-side FET 136 is conductive (shown as a short), and fast leg low-side FET 144 is non-conductive (shown as an open circuit). The configuration shown results in a charging current $I_{CHARGE}$ flowing through the inductance 128, the AC source 106, the slow leg high-side FET 108, and the fast leg high-side FET 136. The charging current has a second polarity (e.g., resulting in a negative voltage at the first lead 130 with respect to the switch node 134), and thus the second polarity is opposite the first polarity. Assuming steady state operation, during the charging of the inductance 128 shown, the output voltage $V_{OUT}$ is supplied by the output capacitor 152. The charging current creates and stores energy in the field surrounding the inductance 128. The bridgeless PFC converter 100 then transitions to discharging the inductance 128 (i.e., the discharge mode).

Figure 6:
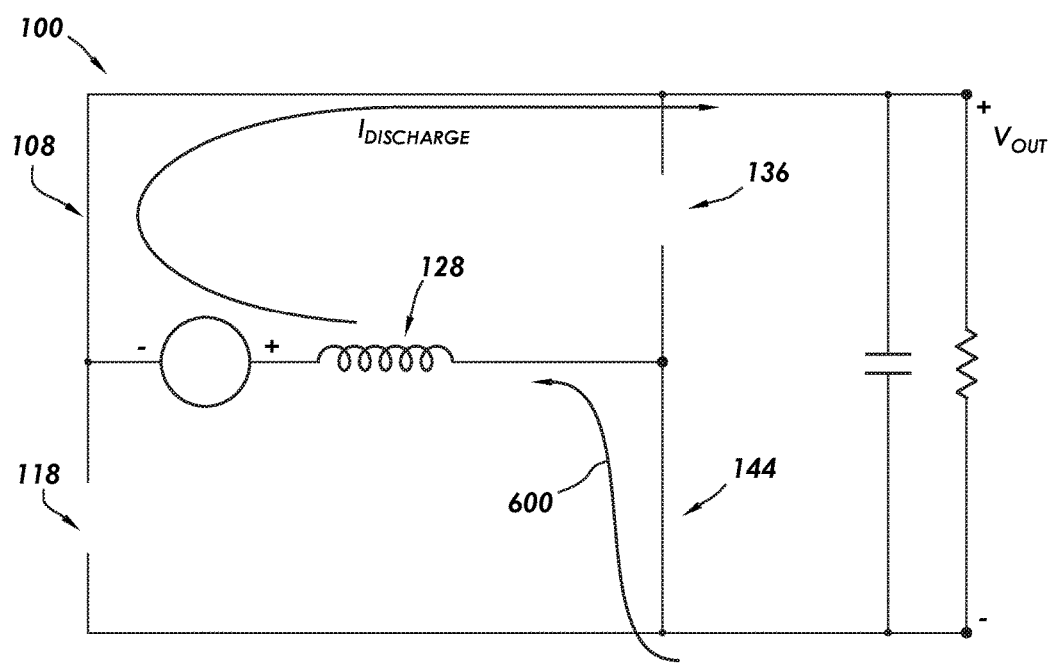
FIG. 6 shows an electrical schematic of a bridgeless PFC converter during a negative half-line cycle and during discharging of the inductance, in accordance with at least some embodiments.

FIG. 6 shows an electrical schematic of a bridgeless PFC converter during a negative half-line cycle and during discharging of the inductance, in accordance with at least some embodiments. In particular, again during the negative half-line cycle the slow leg high-side FET 108 is conductive, and the slow leg low-side FET 118 is non-conductive. The example bridgeless PFC converter 100 of FIG. 6 is shown discharging the inductance 128 (i.e., the charge mode), and thus fast leg high-side FET 136 is non-conductive, and fast leg low-side FET 144 is conductive. Because the current through the inductance cannot change instantaneously, when the bridgeless PFC converter 100 transitions to discharging the inductance 128, a discharge current $I_{DISCHARGE}$ flows through the inductance 128, the AC source 106, the slow leg high-side FET 108 and the load, with return current flowing through fast leg low-side FET 144 (return current shown by line 600). The discharge current thus has the second polarity. More particularly, the discharge current $I_{DISCHARGE}$ flows to the first lead of the output capacitor 152 and/or the positive output 116 of the output voltage $V_{OUT}$. Thus, during the discharging the discharge current $I_{DISCHARGE}$ supplies the output voltage and current, and re-charges the output capacitor 152.

During the example negative half-line cycle, the bridgeless PFC converter 100 switches back and forth between the charge mode and discharge mode to supply the output voltage $V_{OUT}$. In some example embodiments the switching frequency associated with switching between the charge and discharge modes is the same as during the positive half-line cycle, except that in the negative half-line cycle the example embodiments detect peaks for switching, rather than valleys.

Still considering the example negative half-line cycle of FIGS. 5 and 6, the inductance 128, fast leg high-side FET 136, and fast leg low-side FET 144 thus form a non-isolated boost converter, boosting the voltage of the AC source 106 to create the output voltage $V_{OUT}$ during the negative half-line cycle.

Figure 7:
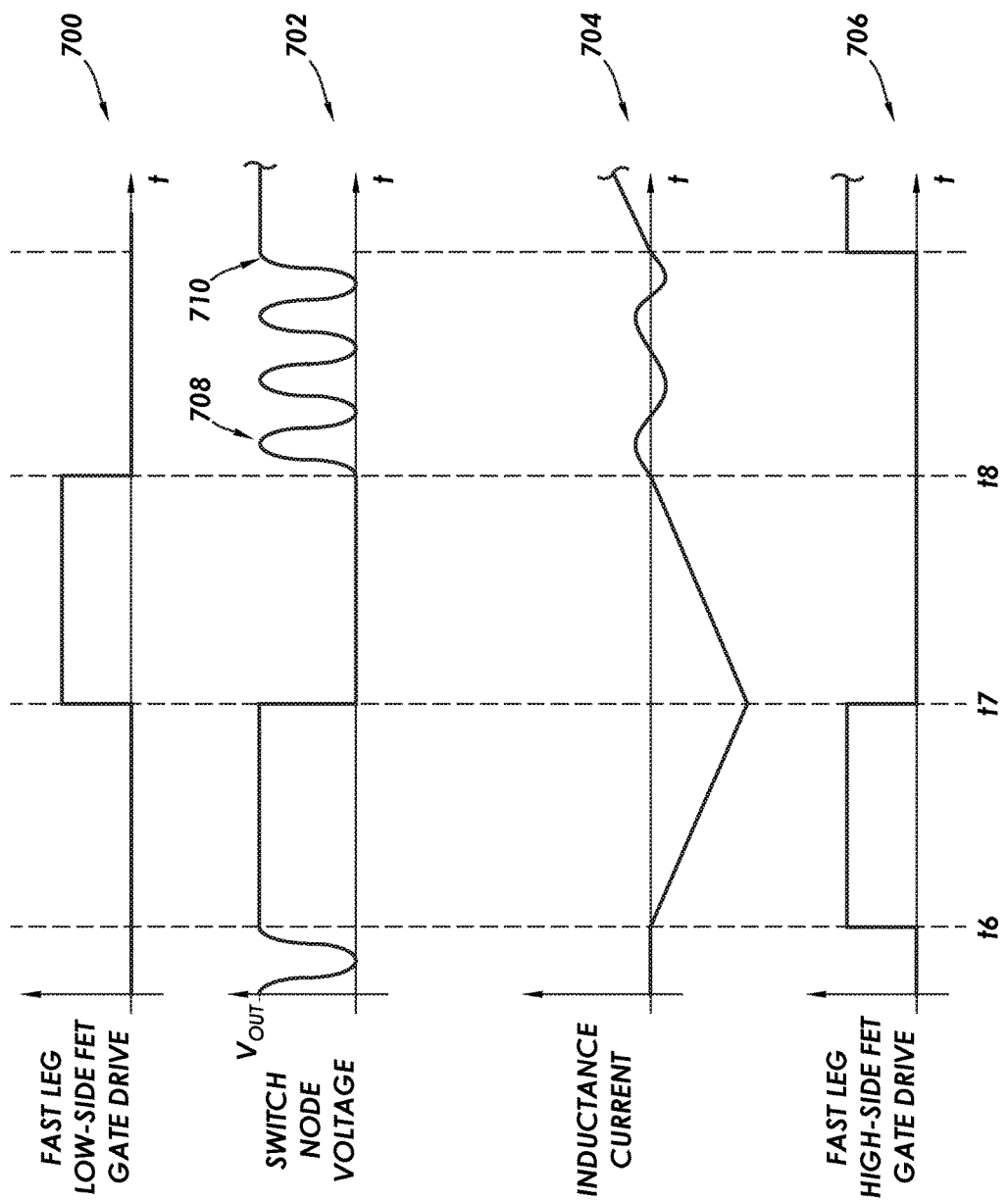
FIG. 7 shows a timing diagram in accordance with at least some embodiments.

FIG. 7 shows a timing diagram in accordance with at least some embodiments. The time scale in FIG. 7 is not necessarily to scale. In particular, plot 700 shows a signal applied to the gate 146 of the fast leg low-side FET 144 (FIG. 1) over about 1.5 cycles of the switching frequency (and during the example negative half-line cycle). Plot 702 shows voltage at the switch node 134 during a corresponding time. Plot 704 shows current through the inductance during a corresponding time. Plot 706 shows a signal applied to the gate 138 of the fast leg high-side FET 136 (FIG. 1) during a corresponding time. In particular, FIG. 7 assumes a discontinuous current mode of the current through the inductance 128 (FIGS. 5 and 6), and thus prior to time t6 the inductor current is effectively zero. However, in the other cases the bridgeless PFC converter may operate in a critical conduction mode. Prior to time t6 the switch node voltage is oscillating (discussed more below).

At time t6, the example bridgeless PFC converter (in the example negative half-line cycle) enters the charge mode by asserting the gate 138 of the fast leg high-side FET 136 (plot 706). With the fast leg high-side FET 136 conductive and the fast leg low-side FET 144 non-conductive, the switch node 134 voltage goes to the output voltage $V_{OUT}$ (plot 702), and a charging current $I_{CHARGE}$ with the second polarity flows in the inductance 128 (plot 704). The charging current $I_{CHARGE}$ builds linearly. When the charging current $I_{CHARGE}$ reaches a predetermined current threshold (which can be measured or estimated) at time t7, the example bridgeless PFC converter transitions to the discharge mode. The example charge mode during the negative half-line cycle is thus defined between times t6 and t7.

At time t7, the bridgeless PFC converter (in the example negative half-line cycle) enters the discharge mode by de-asserting the gate 138 of fast leg high-side FET 136 (plot 706) and simultaneously asserting the gate 146 of the fast leg low-side FET 144 (plot 700). Again in practice a short blanking time may be implemented to avoid cross conduction. With the fast leg high-side FET 136 non-conductive and the fast leg low-side FET 144 conductive, the voltage on the switch node 134 falls to ground, and a discharge current $I_{DISCHARGE}$ flows in the inductance 128 again having the second polarity (plot 704). The discharge current $I_{DISCHARGE}$ falls linearly. The discharge current $I_{DISCHARGE}$ supplies the output voltage and current, and re-charges the output capacitor 152. When the discharge current $I_{DISCHARGE}$ reaches zero at time t8, the fast leg low-side FET 144 is made non-conductive by de-asserting the gate 146.

In example embodiments the discharge current $I_{DISCHARGE}$ reaches zero before the next charge mode begins. In FIG. 7, the discharge current $I_{DISCHARGE}$ reaches zero at time t8. At the point in time when the discharge current $I_{DISCHARGE}$ reaches zero, the voltage at the switch node 134 begins to oscillate (plot 702) based on the interaction of the inductance 128 and the capacitance at the switch node 134. Similarly, the current through the inductance 128 begins to oscillate (plot 704). The oscillation frequency shown in FIG. 7 is exaggerated for clarity, but note that the switch node voltage (plot 702) oscillates in a range of voltages between the output voltage and zero volts. As will be discussed in greater detail below, example bridgeless PFC converters are operated (in the example negative half-line cycle) such that an immediately subsequent charge mode begins in a peak when the voltage across the fast leg high-side FET 136 is below a predetermined voltage threshold. Equivalently stated, the example bridgeless PFC converters are operated (in the example negative half-line cycle) such that an immediately subsequent charge mode begins when voltage across the fast leg high-side FET 136 is at a reduced voltage, which may occur at a maxima in the voltage oscillation at the switch node 134. That is, the voltage across the fast leg high-side FET 136 is lowest when the voltage at the switch node 134 is closest to the output voltage $V_{OUT}$. In situations where the bridgeless PFC converter is supplying high power (e.g., 500 Watts or more), the immediately subsequent charge mode may begin at the first peak 708 of the oscillation of the voltage of the switch node 134 (plot 702). In situation where the bridgeless PFC converter is supplying low power (e.g., less than 300 Watts), the immediately subsequent charge mode made may begin at the Nth peak (e.g., fourth peak 710), where the N is selected based on a value indicative of power provided to the load.

FIGS. 5, 6, and 7 are all with respect to the negative half-line cycle of the frequency of the AC source 106. More precisely, during periods of time when the voltage impressed on the second line input 104 by the AC source 106 is lower than the voltage impressed on the first line input 102.

The various embodiments of the bridgeless PFC converter discussed to this point have assumed but not expressly shown the presence of a PFC controller controlling the various FETS, and monitoring the various signals. The specification now turns to a more detailed description of a bridgeless PFC converter including a PFC controller.

Figure 8:
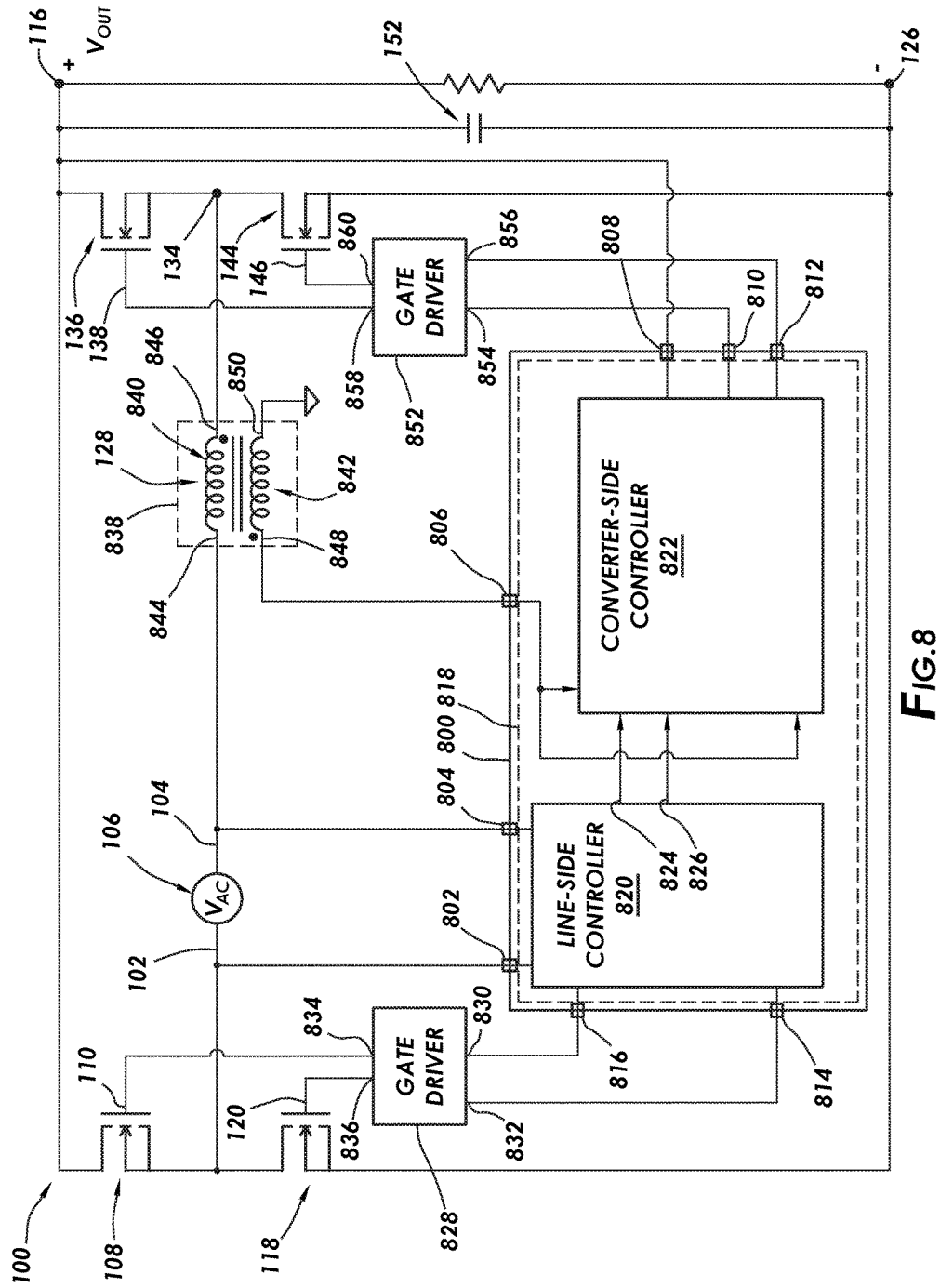
FIG. 8 shows a partial schematic, partial block diagram, of a bridgeless PFC controller in accordance with at least some embodiments.

FIG. 8 shows a partial schematic, partial block diagram, of a bridgeless PFC converter in accordance with at least some embodiments. In particular, FIG. 8 shows many of the same components introduced in FIG. 1, and those components carry the same reference numbers and will not be re-introduced with respect to FIG. 8. FIG. 8 expressly shows PFC controller 800 within the overall bridgeless PFC converter 100. The example PFC controller 800 is a packaged integrated circuit (IC) having a plurality of terminals electrically exposed on an outside surface of the packaged IC. In some example systems, the packaged IC is a 20 pin dual in-line package (DIP), but any suitable packaging may be used. The example PFC controller 800 defines a first line sense terminal 802, a second line sense terminal 804, a winding sense terminal 806, a feedback terminal 808, a high terminal 810, a low terminal 812, a slow leg low-side terminal 814, and slow leg high-side terminal 816. Additional terminals will be present (e.g., power, ground or common), but the additional terminals are omitted so as not to unduly complicate the figure.

In the example embodiment, the inductance 128 is provided by a multi-winding boost inductor 838. The multi-winding boost inductor 838 defines a primary winding 840 magnetically coupled to a secondary winding 842. The primary winding 840 defines a first lead 844 coupled to the second line input 104. The primary winding 840 defines a second lead 846 coupled to and defining the switch node 134. Thus, the inductance 128 is the inductance of the primary winding 840. The secondary winding 842 defines a first lead 848 and a second lead 850. The first lead 848 couples to the winding sense terminal 806. The second lead 850 couples to a reference voltage, such as ground or common. While the first lead 848 is shown coupled directly to the winding sense terminal 806, in other cases additional resistor-divider networks may be included to reduce the voltage. In example embodiments the polarity of the voltages is as defined by the dot convention within the symbol for the multi-winding boost inductor. Thus, a current producing a positive voltage at the first lead 844 of the primary winding 840 with respect to the second lead 846 produces a negative voltage at first lead 848 of the secondary winding 842 with respect to second lead 850, and vice versa. However, suitably adjusted the PFC controller 800 may be operational with multi-winding boost inductor 838 having the opposite polarity relationship.

While in some cases the PFC controller 800 may be able to directly drive the gates of the FETs, example embodiments use a gate driver 828 to perform the task with respect to the slow leg high-side FET 108 and slow leg low-side FET 118. Example embodiments also use a gate driver 852 to perform the task with respect to the fast leg high-side FET 136 and the fast leg low-side FET 144. Example gate driver 828 defines a slow leg high-side input 830, a slow leg low-side input, 832, a high-gate output 834, and a low-gate output 836. The slow leg high-side input 830 couples to the slow leg high-side terminal 816. The slow leg low-side input 832 couples to the slow leg low-side terminal 814. The high-gate output 834 couples to gate 110 of slow leg high-side FET 108. The low-gate output 836 couples to gate 120 of the slow leg low-side FET 118. Gate driver 828 makes the FETs 108 and 118 conductive and non-conductive responsive to signals driven to the terminals 814 and 816 of the PFC controller 800. Example gate driver 852 defines a high input 854, a low input, 856, a high-gate output 858, and a low-gate output 860. The high input 854 couples to the high terminal 810. The low input 856 couples to the low terminal 812. The high-gate output 858 couples to the gate 138 of fast leg high-side FET 136. The low-gate output 860 couples to gate 146 of the fast leg low-side FET 144. Gate driver 852 makes the FETs 136 and 144 conductive and non-conductive responsive to signals driven to the terminals 810 and 812 of the PFC controller 800.

In accordance with at least some embodiments, the PFC controller 800 includes an integrated circuit defined on a substrate 818 within the packaging; however, the functionality of the PFC controller 800 may be embodied on multiple substrates co-packaged within the packaging and electrically coupled to each other and the various terminals. The functionality of the PFC controller 800 may be conceptually, though not necessarily physically, divided into a line-side controller 820 and a converter-side controller 822. The example line-side controller 820 is coupled to the first line sense terminal 802, the second line sense terminal 804, the slow leg high-side terminal 816, and the slow leg low-side terminal 814. The first line sense terminal 802 is coupled to the first line input 102 of the AC source 106. The second line sense terminal 804 is coupled to the second line input 104 of the AC source 106. While FIG. 8 shows terminals 802 and 804 coupled directly to the line inputs 102 and 104, respectively, in practice the connections may include voltage dividers to lower the voltages applied to the PFC controller 800 from the AC source 106. The example line-side controller 820 is also coupled to the slow leg high-side terminal 816 and the slow leg low-side terminal 814. The line-side controller 820 is configured to sense polarity of the AC source 102 by way of the first line sense terminal 802 and the second line sense terminal 804, and the line-side controller 820 is configured to assert the slow leg low-side terminal 814 and de-assert the slow leg high-side terminal 816 when the polarity is positive (e.g., higher voltage on the second line input 104 than the first line input 102). Further, the line-side controller 820 is configured to assert the slow leg high-side terminal 816 and de-assert the slow leg low-side terminal 814 when the polarity is negative (e.g., higher voltage on the first line input 102 than the second line input 104). Relatedly, the example line-side controller 802 defines two outputs, positive-polarity output 824 and negative polarity output 826. The line-side controller 820 in example embodiments asserts the positive polarity output 824 and de-asserts the negative polarity output 826 when the polarity of the AC source 106 is positive, and de-asserts the positive polarity output 824 and asserts the negative polarity output 826 when the polarity of the AC source 106 is negative.

The example PFC controller 800 further includes the converter-side controller 822. The converter-side controller 822 is coupled to the winding sense terminal 806, the feedback terminal 808, the high terminal 810, and the low terminal 812. During the positive half-line cycle, the converter-side controller 822 places the converter 100 in the charge and discharge modes to supply the output voltage $V_{OUT}$. That is, the converter-side controller 822 charges the primary winding 840 of the multi-winding boost inductor 838 through the fast leg low-side FET 144 by asserting the low terminal 812 and de-asserting the high terminal 810. The converter-side controller 822 places the converter in the discharge mode and discharges the primary winding 840 through the fast leg high-side FET 136 by asserting the high terminal 810 and de-asserting the low terminal 812. After the discharge mode, the converter-side controller 822 is configured to sense a falling edge of a voltage at the switch node 134 by way of the winding sense terminal 806, the falling edge indicative of a valley in the oscillating voltage of the switch node 134. Once a suitable falling edge is determined, the converter-side controller 822 is configured to trigger a subsequent charge mode of the primary winding 840 based on the falling edge (and again during the positive half-line cycle).

During a negative half-line cycle, the converter-side controller 822 places the converter 100 in the charge and discharge modes to supply the output voltage $V_{OUT}$. That is, the converter-side controller 822 charges the primary winding 840 of the multi-winding boost inductor 838 through the fast leg high-side FET 136 by asserting the high terminal 810 and de-asserting the low terminal 812. The converter-side controller 822 places the converter in the discharge mode and discharges the primary winding 840 through the fast leg low-side FET 144. After the discharge mode, the converter-side controller 822 is configured to sense a rising edge of the voltage at the switch node 134 by way of the winding sense terminal 806, the rising edge indicative of a peak in the oscillating voltage of the switch node 134. Once a suitable rising edge is determined, the converter-side controller 822 is configured to trigger a subsequent charge mode of the primary winding 840 based on the rising edge (and again during the negative half-line cycle).

Before turning to a more detailed discussion of the converter-side controller 822, it is noted that the example PFC controller 800 senses the falling edges of the voltage oscillation on the switch node 134 during the positive half-line cycle by sensing voltage on the first lead 848 of the secondary winding 842 of the multi-winding boost inductor 838. Similarly, the example PFC controller 800 senses the rising edges of the voltage oscillation on the switch node 134 during the negative half-line cycle by sensing voltage on the first lead 848 of the secondary winding 842 of the multi-winding boost inductor 838. In both cases, the first lead is and remains coupled to the winding sense terminal. Similarly, in both cases the second lead 850 of the secondary winding 842 is and remains coupled to a reference voltage (e.g., ground or common). Thus, no switch network is implemented outside the PFC controller 800 between the PFC controller 800 and the multi-winding boost inductor 838.

Figure 9:
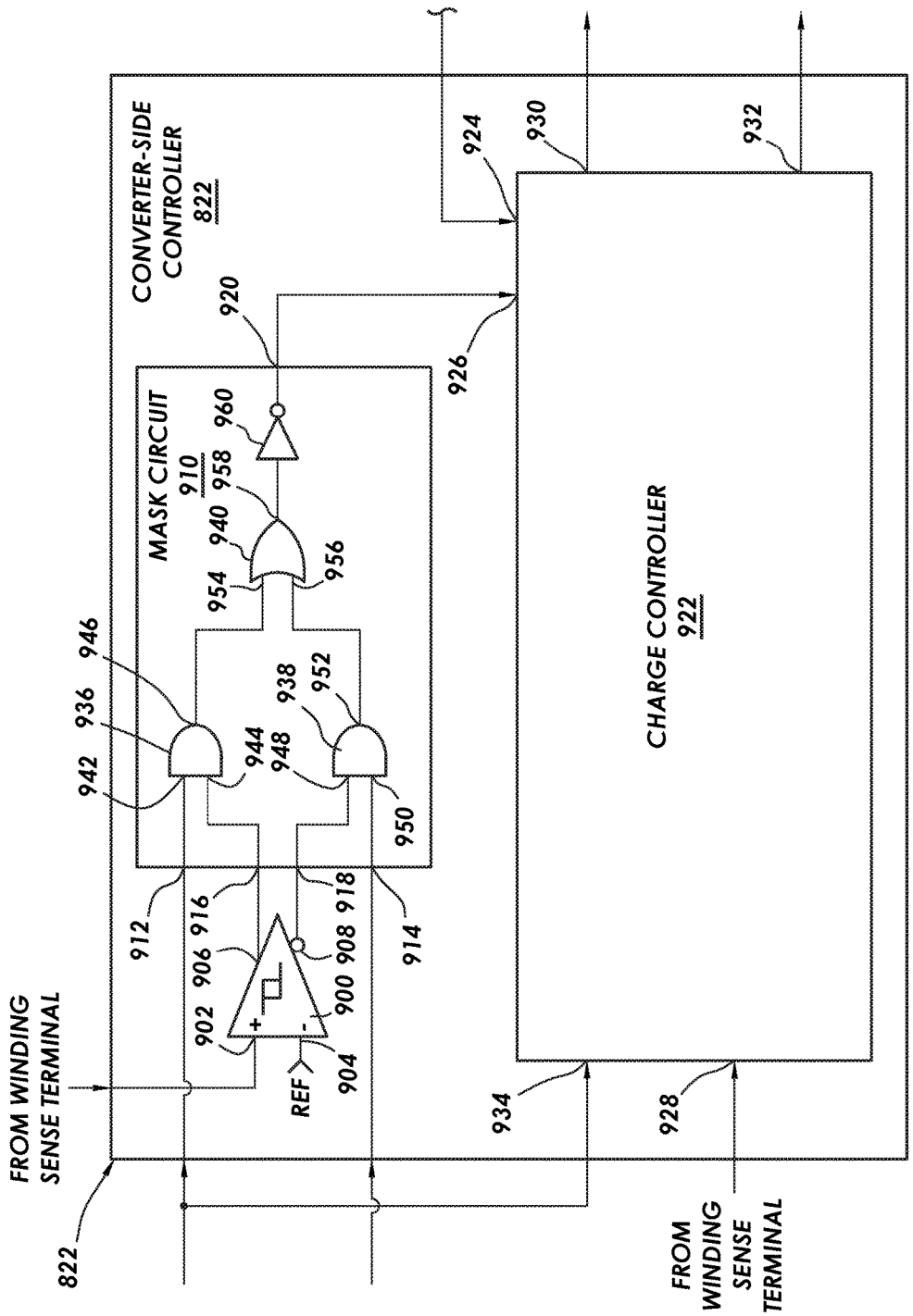
FIG. 9 shows a block diagram of a converter-side controller in accordance with at least some embodiments.

FIG. 9 shows a block diagram of a converter-side controller in accordance with at least some embodiments. In particular, the converter-side controller 822 comprises a comparator 900 defining a first input 902, a second input 904, a non-inverted output 906, and an inverted output 908. The first input 902 is coupled to the winding sense terminal 806 (FIG. 8), and the second input 904 is coupled to a reference voltage. The converter-side controller 822 further comprises a mask circuit 910 defining a first mask input 912, a second mask input 914, a non-inverted input 916, an inverted input 918, and a mask output 920. The non-inverted input 916 is coupled to the non-inverted output 906 of the comparator 900. The inverted input 918 is coupled to the inverted output 908 of the comparator 900. The first mask input 912 is coupled to the positive polarity output 824 (FIG. 8) of the line-side controller 820 (FIG. 8). The second mask input 914 is coupled to the negative polarity output 826 (FIG. 8) of the line-side controller 820.

For reasons that will become clearer based on the discussion below, the example comparator 900 may be designed and constructed to implement a hysteresis function, as indicated by the Schmidt trigger symbol within the comparator 900. The hysteresis function implies that the comparator 900 changes states of its outputs at different voltages applied to the inputs depending on the relative voltages on the inputs. In some example cases, the difference in trigger point may be 100 milli-Volts (mV), and in other cases the difference may be 500 mV. More precisely, when sensing falling edges the comparator 900 may change at lower voltages (e.g., 500 mV lower) than when sensing rising voltages. The voltage sensed at the first input 902 is a voltage indicative of the switch node voltage created by the secondary winding 842 of the multi-winding boost inductor 838.

The mask circuit 910 is configured to mask a signal on the inverted input 918 when the first mask input 912 is asserted. Similarly, the mask circuit 910 is configured to mask the signal on the non-inverted input 916 when the second mask input 914 is asserted. An example circuit to implement the masking is discussed more below; however, in other cases a single mask input may be used (e.g., only the first mask input 912), and in such cases the mask circuit 910 may be configured to mask a signal on the non-inverted input 916 and unmask the signal on the inverted input 918 when the first mask input 912 is asserted, and configured to unmask the signal on the non-inverted input 916 and mask the signal on the inverted input 918 when the first mask input 916 is de-asserted.

FIG. 9 shows an example mask circuit 910 designed and constructed to perform the masking function. In particular, the example mask circuit 910 comprises two AND gates 936 and 938, and an OR gate 940. The AND gate 936 has a first input 942 coupled to the first mask input 912, a second input 944 coupled to the non-inverted output 906 of the comparator 900, and an output 946. The AND gate 938 has a first input 950 coupled to the second mask input 914, a second input 948 coupled to the inverted output 908 of the comparator 900, and an output 952. The OR gate 940 has a first input 954 coupled to the output 946, a second input 956 coupled to the output 952, and an output 958 coupled the mask output 920 through a NOT gate 960. During periods of time when the first mask input 912 has a high voltage and the second mask input 914 has a low voltage (e.g., the positive half-line cycle), the signals on the non-inverted output 906 of the comparator 900 are allowed to propagate through to the mask output 920. During periods of time when the first mask input 912 has a low voltage and the second mask input 914 has a high voltage (e.g., the negative half-line cycle), the signals on the inverted output 908 of the comparator 900 are allowed to propagate through to the mask output 920. Thus, the masking of particular signals takes place when the respective mask signals are a low voltage (which may be referred to as asserted low). One of ordinary skill in the art, with the benefit of this disclosure and now understanding the functionality of the mask circuit 910, could create many equivalent circuits to perform the selective masking function, including swapping asserted states.

Still referring to FIG. 9, the example converter-side controller 822 further comprises a charge controller 922 defining a feedback input 924, a transition input 926, a winding sense input 928, a high drive output 930, a low drive output 932, and a polarity input 934. The feedback input 924 is coupled to the feedback terminal 808 (FIG. 8). The transition input 926 is coupled to the mask output 920. The winding sense input 928 is coupled to the winding sense terminal 806 (FIG. 8). The high drive output 930 is coupled to the high terminal 810 (FIG. 8). The low drive output 932 is coupled to the low terminal 812 (FIG. 8). And the polarity input 934 is coupled to one of the polarity outputs 824 or 826 (as shown, positive-polarity output 824).

The charge controller 922 is configured to determine polarity of the AC source 106, such as by reading a signal on the polarity input 934. During periods of time when the polarity is positive, to enter the charge mode the charge controller 922 is configured to assert the low drive output 932 (and thus the low terminal 812) responsive to assertion of the transition input 926 by the mask output 920. In an example critical conduction mode, the charge controller 922 may enter the charge mode on the first assertion of the transition input 926. That is, the charge mode may be entered in the first valley 408 (FIG. 4). During discontinuous conduction mode, the charge controller 922 may enter the charge mode on the Nth transition of the transition input 926. That is, the charge mode may be entered on the Nth valley (e.g., fourth valley 410 (FIG. 4)). Thus, assertion of the transition input 926 starts the charge mode in the positive half-line cycle.

During periods of time when the polarity is negative, to enter the charge mode the charge controller 922 is configured to assert the high drive output 930 (and thus the high terminal 810) responsive to assertion of the transition input 926 by the mask output 920. In an example critical conduction mode, the charge controller 922 may enter the charge mode on the first assertion of the transition input 926. That is, the charge mode may be entered in the peak 708 (FIG. 7). During discontinuous conduction mode, the charge controller 922 may enter the charge mode on the Nth transition of the transition input 926. That is, the charge mode may be entered on the Nth peak (e.g., fourth peak 710 (FIG. 7)). Thus, assertion of the transition input 926 starts the charge mode in the negative half-line cycle.

Figure 10:
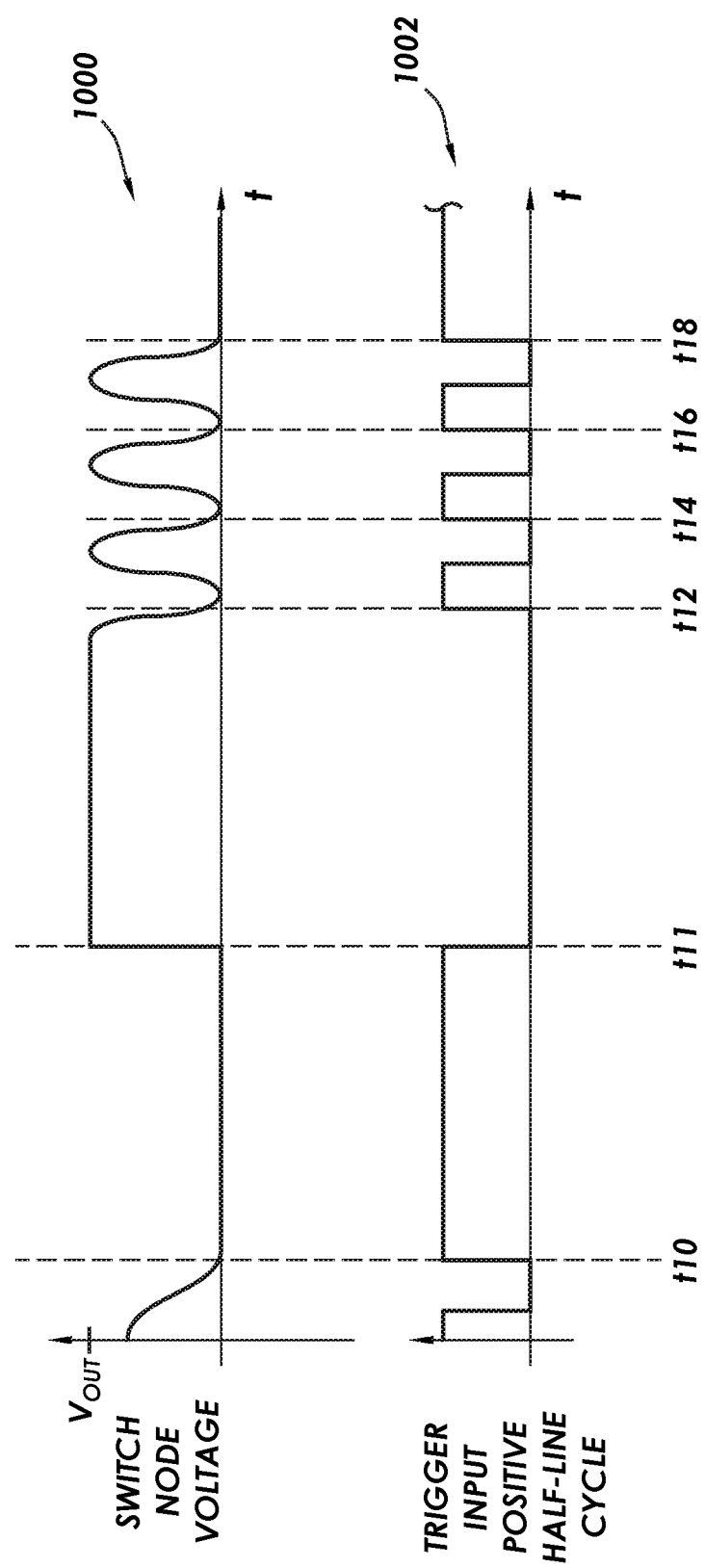
FIG. 10 shows a timing diagram in accordance with at least some embodiments.

FIG. 10 shows a timing diagram in accordance with at least some embodiments (e.g., critical or discontinuous conduction mode). In particular, plot 1000 shows an example switch node 134 (FIG. 1) voltage during a positive half-line cycle, and plot 1002 shows the transition input 926 (FIG. 9) voltage to the charge controller 922 during the same period of time. At time t10 the example bridgeless PFC controller enters the charge mode, and thus the voltage on the switch node 134 is grounded. In example embodiments, the transition input 926 goes high during the charge mode. At time t11 the charge modes ends, and the discharge mode begins. The example transition input 926 goes low during the discharge mode. At the end of the discharge mode, the inductor current falls and thus the voltage on the switch node 134 falls. Referring simultaneously to FIGS. 9 and 10, in example systems the falling voltage on the switch node 134 is sensed by the comparator 900 (sensed though the secondary winding of the multi-winding boost inductor), and the non-inverted output 906 goes de-asserted when the sensed version of the voltage on the switch node 134 falls below the reference voltage by the hysteresis amount. Because the bridgeless PFC converter is in the positive half-line cycle, the first mask input 912 will have a high voltage, and the transition of the non-inverted output 906 passes through the AND gate 936, the OR gate 940, and to the transition input 926, as shown at time t12. As the voltage on the switch node 134 is oscillating, the voltage again begins to rise, and the non-inverted output 906 is asserted when the sensed version of the voltage on the switch node 134 rises above the reference voltage by the hysteresis amount. The cycle continues for each oscillation of the switch node voltage, with the transition input 926 being asserted on each falling edge of the switch node voltage 134, such as at times t14, t16, and t18. Depending on the loading of the bridgeless PFC converter and the inductor conduction mode, the charge controller 922 may begin the next charge mode responsive to any of the assertions of the transition input 926.

Figure 11:
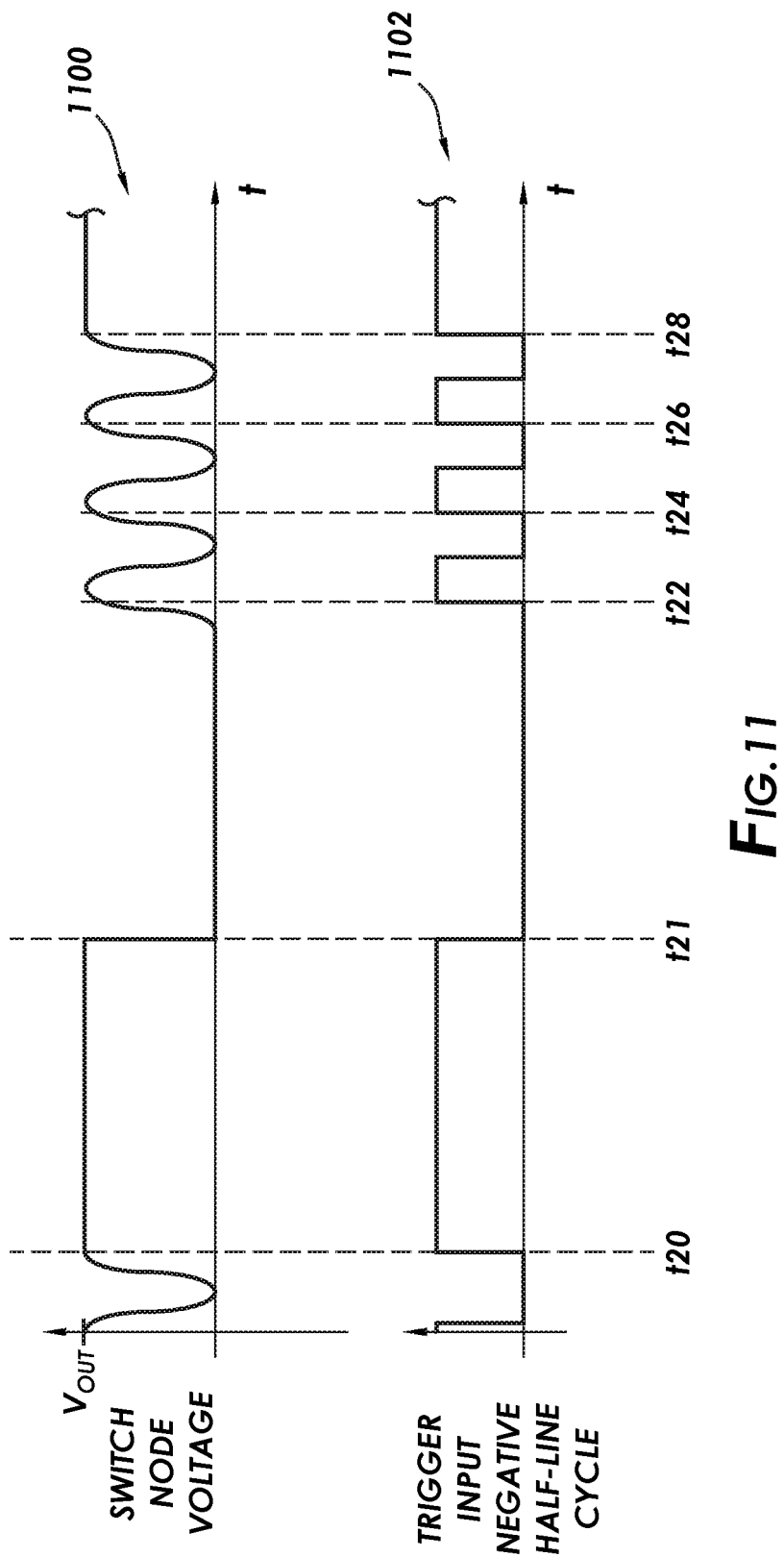
FIG. 11 shows a timing diagram in accordance with at least some embodiments.

FIG. 11 shows a timing diagram in accordance with at least some embodiments. In particular, plot 1100 shows an example switch node voltage 134 (FIG. 1) during a negative half-line cycle, and plot 1102 shows the trigger input 926 (FIG. 9) to the charge controller 922 during the same period of time. At time t20 the example bridgeless PFC controller enters the charge mode, and thus the voltage on the switch node 134 is pulled to the output voltage $V_{OUT}$. In example embodiments, the transition input 926 goes high during charge mode, though additional masking may be present such that the transition input 926 is masked or ignored during the charge mode (regardless of the polarity of the half-line cycle).

At time t21 the charge modes ends, and the discharge mode begins. At the end of the discharge mode, the inductor current falls and thus the voltage on the switch node 134 rises. Referring simultaneously to FIGS. 9 and 11, in example systems the rising voltage on the switch node 134 is sensed by the comparator 900 (sensed though the secondary winding of the multi-winding boost inductor), and the inverted output 908 goes de-asserted when the sensed version of the voltage on the switch node 134 rises above the reference voltage by the hysteresis amount. Because the bridgeless PFC converter is in the negative half-line cycle, the second mask input 914 will have a high voltage, and the transition of the inverted output 908 passes through the AND gate 938, the OR gate 940, and to the transition input 926, as shown at time t22. As the voltage on the switch node 134 is oscillating, the voltage again begins to fall, and the inverted output 908 is asserted when the sensed version of the voltage on the switch node 134 falls below the reference voltage by the hysteresis amount. The cycle continues for each oscillation of the switch node voltage, with the transition input 926 being asserted on each rising edge of the switch node 134 voltage, such as at times t24, t26, and t28. Depending on the loading of the bridgeless PFC converter and the inductor conduction mode, the charge controller 922 may begin the next charge mode responsive to any of the assertions of the transition input 926.

Referring simultaneously to FIGS. 10 and 11. Some example embodiments use a single comparator to perform the triggering for transition to charge mode in both the positive half-line cycle and the negative half-line cycle. While in some cases the only one comparator may implement no hysteresis, the hysteresis of the example comparator moves the trigger point closer to the valleys (during the positive half-line cycles) and closer to the peaks (during the negative half-line cycles). The hysteresis amount may selected during the design stage to take into account propagation delay between a trigger event for entering a charge mode and when the respective FETs can be driven fully conductive. In other cases, the width of the hysteresis may be adjusted by way of devices external to the PFC controller 800, such as by external resistances and/or capacitances to tune the converter to reduce switching losses taking into account external aspects, such as propagation delay through the gate driver 852, and responsiveness of the high and fast leg low-side FETs.

Figure 12:
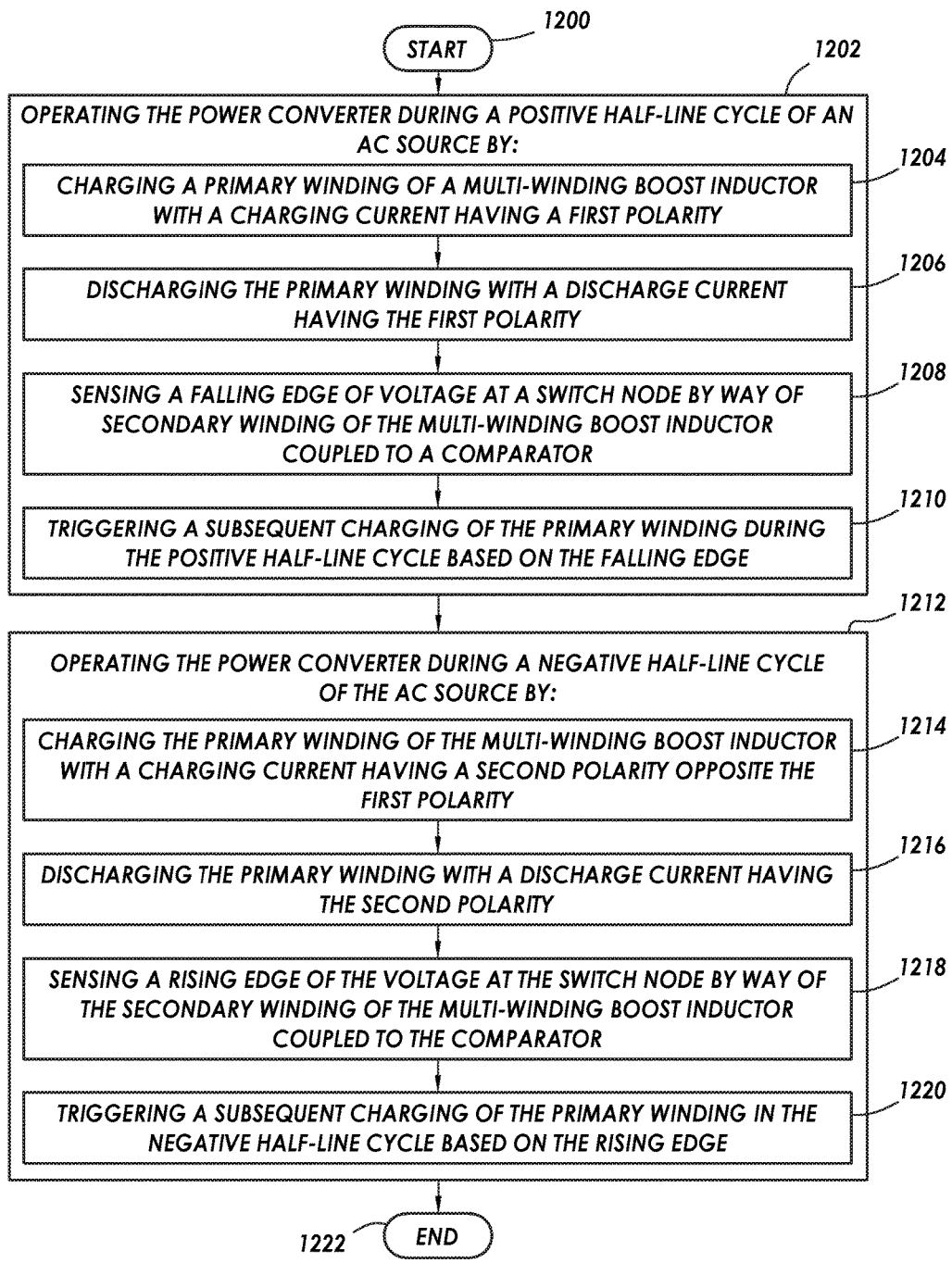
FIG. 12 shows a method in accordance with at least some embodiments.

FIG. 12 shows a method in accordance with at least some embodiments. In particular, the method starts (block 1200) and includes: operating the power converter during a positive half-line-cycle of an input AC voltage frequency (1202) by: charging a primary winding of a multi-winding boost inductor with a charging current having a first polarity (block 1204); and then discharging the primary winding with a discharge current having the first polarity, the discharge current flowing to a first lead of a smoothing capacitor (block 1206); sensing a falling edge of a voltage at a switch node by way of a secondary winding of the multi-winding boost inductor coupled to a comparator (block 1208); and triggering a subsequent charging of the primary winding during the positive half-line cycle based on the falling edge (block 1210). The method further includes operating the power converter during a negative half-line cycle of the frequency of the AC source (block 1212) by: charging the primary winding of the multi-winding boost inductor with a charging current having a second polarity opposite the first polarity (block 1214); and then discharging the primary winding with a discharge current having the second polarity, the discharge current flowing to the first lead of the smoothing capacitor (block 1216); sensing a rising edge of the voltage at the switch node by way of the secondary winding of the multi-winding boost inductor coupled to the comparator (block 1218); and triggering a subsequent charging of the primary winding in the negative half-line cycle based on the rising edge (block 1220). Thereafter the method ends (block 1222).

The above discussion is meant to be illustrative of the principles and various embodiments of the present invention. Numerous variations and modifications will become apparent to those skilled in the art once the above disclosure is fully appreciated. For example, the multi-winding boost inductor may be a transformer. It is intended that the following claims be interpreted to embrace all such variations and modifications.

What is claimed is:

1. A method of operating a power converter, comprising:
operating the power converter during a positive half-line cycle of an alternating current (AC) source by:
charging a primary winding of a multi-winding boost inductor with a charging current having a first polarity; and then
discharging the primary winding with a first discharge current having the first polarity;
sensing a falling edge of a voltage at a switch node by way of a secondary winding of the multi-winding boost inductor coupled to a comparator; and
triggering a subsequent charging of the primary winding during the positive half-line cycle based on the falling edge;

operating the power converter during a negative half-line cycle of the frequency of the AC source by:
charging the primary winding of the multi-winding boost inductor with a charging current having a second polarity opposite the first polarity; and then
discharging the primary winding with a second discharge current having the second polarity;
sensing a rising edge of the voltage at the switch node by way of the secondary winding of the multi-winding boost inductor coupled to the comparator; and
triggering a subsequent charging of the primary winding in the negative half-line cycle based on the rising edge.

2. The method of claim 1:
wherein sensing the falling edge further comprises sensing a voltage on a first lead of the secondary winding, and a second lead of the secondary winding coupled to a reference voltage; and
wherein sensing the rising edge further comprises sensing a voltage on the first lead of the secondary winding, and the second lead of the secondary winding coupled to the reference voltage.

3. The method of claim 1:
wherein sensing the falling edge further comprises sensing by the comparator having a hysteresis voltage; and
wherein sensing the rising edge further comprises sensing by the comparator having the hysteresis voltage.

4. The method of claim 1:
wherein sensing the falling edge further comprises sensing by the comparator having a hysteresis voltage of between and including 100 milli-Volts (mV) and 500 mV; and
wherein sensing the rising edge further comprises sensing by the comparator having the hysteresis voltage of between and including 100 mV and 500 mV.

5. The method of claim 1:
wherein triggering the subsequent charge cycle during the positive half-line cycle further comprises making a first electrically controlled switch conductive when voltage across the first electrically controlled switch is below a predetermined voltage threshold; and
wherein triggering the subsequent charge cycle during the negative half-line cycle further comprises making a second electrically controlled switch conductive when voltage across the second electrically controlled switch is below the predetermined voltage threshold.

6. A packaged integrated circuit (IC) device for controlling a bridgeless power factor correcting (PFC) converter, comprising:
a winding sense terminal, a slow leg high-side terminal, a slow leg low-side terminal, a high terminal, a low terminal, and a feedback terminal;
a line-side controller coupled to the slow leg high-side terminal and the slow leg low-side terminal, the line-side controller configured to sense polarity of an alternating current (AC) signal, and the line-side controller configured to assert the slow leg low-side terminal and de-assert the slow leg high-side terminal when the polarity is positive, and the line-side controller configured to assert the slow leg high-side terminal and de-assert the slow leg low-side terminal when the polarity is negative;
a converter-side controller coupled to the high terminal, the low terminal, and the winding sense terminal, the converter-side controller comprising:

a comparator defining a first input, a second input, a non-inverted output, and an inverted output, the first input coupled to the winding sense terminal, and the second input coupled to a reference voltage;

a mask circuit defining a mask input, a non-inverted input, an inverted input, and a mask output, the non-inverted input coupled to the non-inverted output of the comparator, and the inverted input coupled to the inverted output of the comparator, the mask circuit configured to mask the non-inverted input when the mask input is asserted, and the mask circuit configured to mask the inverted input when the mask input is de-asserted;

a charge controller defining a feedback input and a transition input, the feedback input coupled to the feedback terminal, and the transition input coupled to the mask output;

the charge controller is configured to, during periods of time when the polarity is positive, assert the low terminal responsive to assertion of the mask output; and the charge controller configured to, during periods of time when the polarity is negative, assert the high terminal responsive to assertion of the mask output.

7. The packaged IC of claim 6 wherein, during periods of time when the polarity is positive, the charge controller is further configured to, responsive to assertion of the mask output:
assert the low terminal; and then
monitor a signal indicative of inductor current on the winding sense terminal; and when the signal indicative of inductor current reaches a predetermined threshold assert the high terminal and de-assert the low terminal.

8. The packaged IC of claim 7 wherein, during periods of time when the polarity is negative, the charge controller is further configured to, responsive to assertion of the mask output:
assert the high terminal; and then
monitor the signal indicative of inductor current on the winding sense terminal; and when the signal indicative of inductor current reaches the predetermined threshold de-assert the high terminal and assert the low terminal.

9. The packaged IC of claim 6 wherein, during periods of time when the polarity is positive, the charge controller is further configured to assert the low terminal responsive to assertion of the mask output and an indication of output voltage on the feedback terminal.

10. The packaged IC of claim 9 wherein, during periods of time when the polarity is negative, the charge controller is further configured to assert the high terminal responsive to assertion of the mask output and an indication of output voltage on the feedback terminal.

11. The packaged IC of claim 6 wherein, during periods of time when the polarity is positive, the charge controller is further configured to assert the low terminal responsive to a predetermined number of assertions of the mask output and an indication of output voltage on the feedback terminal.

12. The packaged IC of claim 11 wherein, during periods of time when the polarity is negative, the charge controller is further configured to assert the high terminal responsive to the predetermined number of assertions of the mask output and an indication of output voltage on the feedback terminal.

13. The packaged IC of claim 6 wherein the winding sense terminal, the high terminal, the low terminal, the slow leg high-side terminal, the slow leg low-side terminal, and the feedback terminal are electrically exposed on an exterior surface of the packaged IC.

14. A bridgeless power factor correcting (PFC) converter, comprising:
a first line input and a second line input;
a slow leg high-side field effect transistor (FET) defining a gate, a source coupled to the first line input, and a drain coupled to a positive output of the converter;
a slow leg low-side FET defining a gate, a drain coupled to the first line input, and a source coupled to a negative output of the converter;
a multi-winding boost inductor defining a primary winding with a first lead coupled to the second line input, and a second lead defining a switch node;
a fast leg high-side FET defining a gate, a source coupled to the switch node, and a drain coupled to the positive output of the converter;
a fast leg low-side FET defining a gate, a source coupled to the negative output of the converter, and a drain coupled to the switch node;
a PFC controller configured to operate the converter during a positive half-line cycle of a frequency of an alternating current (AC) source coupled to the first and second line inputs, the operation by causing the converter to:
charge the primary winding of the multi-winding boost inductor through the fast leg low-side FET with a charging current having a first polarity; and then
discharge the primary winding through the fast leg high-side FET with a first discharge current having the first polarity;
sense a falling edge of a voltage at the switch node by way of a comparator; and
trigger a subsequent charging of the primary winding during the positive half-line cycle based on the falling edge;
the PFC controller configured to operate the converter during a negative half-line cycle of the frequency of the AC source by causing the converter to:
charge the primary winding of the multi-winding boost inductor through the fast leg high-side FET with a charging current having a second polarity opposite the first polarity; and then
discharge the primary winding through the fast leg low-side FET with a second discharge current having the second polarity;
sense a rising edge of the voltage at the switch node by way of the comparator; and
trigger a subsequent charging of the primary winding in the negative half-line cycle based on sensing the rising edge.

15. The bridgeless PFC converter of claim 14:
the multi-winding boost inductor further comprises a secondary winding with a first lead and a second lead, the second lead coupled to a reference voltage;
wherein when the PFC controller senses the falling edge, the PFC controller is further configured to sense a voltage on the first lead of the secondary winding, the first lead of the secondary winding coupled to the comparator; and
wherein sensing the rising edge further comprises sensing a voltage on the first lead of the secondary winding by way of the comparator.

16. The bridgeless PFC converter of claim 14:
wherein when the PFC controller senses the falling edge, the PFC controller is further configured to sense by the comparator having a hysteresis voltage; and wherein when the PFC controller senses the rising edge, the PFC controller is further configured to sense by the comparator having the hysteresis voltage.

17. The bridgeless PFC converter of claim 14:
wherein when the PFC controller senses the falling edge, the PFC controller is further configured to sense by the comparator having a hysteresis voltage of between and including 100 milli-volts (mV) and 500 mV; and
wherein when the PFC controller senses the rising edge, the PFC controller is further configured to sense by the comparator having the hysteresis voltage of between and including 100 milli-volts (mV) and 500 mV.

18. The bridgeless PFC converter of claim 14:
wherein when the PFC controller triggers the subsequent charge cycle during the positive half-line cycle, the PFC controller is further configured to make the fast leg low-side FET conductive when voltage across the fast leg low-side FET is below a first predetermined threshold voltage; and
wherein when the PFC controller triggers the subsequent charge cycle during the negative half-line cycle, the PFC controller is further configured to make the fast leg high-side FET conductive when voltage across the fast leg high-side FET is below a second predetermined threshold.

19. The bridgeless PFC converter of claim 14 wherein the PFC controller further comprises:
the multi-winding boost inductor further comprises a secondary winding with a first lead and a second lead, the second lead coupled to a reference voltage;
a winding sense terminal coupled to the first lead of the secondary winding, a high terminal coupled to the gate of the fast leg high-side FET, a low terminal coupled to the gate of the fast leg low-side FET, a slow leg high-side terminal coupled to the gate of the slow leg high-side FET, a slow leg low-side terminal coupled to the gate of the slow leg low-side FET, and a feedback terminal coupled to the positive output of the converter;
a line-side controller coupled to the slow leg high-side terminal and the slow leg low-side terminal, the line-side controller configured to sense polarity of the AC source, and the line-side controller configured to assert the slow leg low-side terminal and de-assert the slow leg high-side terminal when the polarity is positive, and the line-side controller configured to assert the slow leg high-side terminal and de-assert the slow leg low-side terminal when the polarity is negative;
a converter-side controller coupled to the high terminal, the low terminal, and the winding sense terminal, the converter-side controller comprising:
the comparator defining a first input, a second input, a non-inverted output, and an inverted output, the first input coupled to the winding sense terminal, and the second input coupled to a reference voltage;
a mask circuit defining a mask input, a non-inverted input, an inverted input, and a mask output, the non-inverted input coupled to the non-inverted output of the comparator, and the inverted input coupled to the inverted output of the comparator, the mask circuit configured to mask the non-inverted input when the mask input is asserted, and the mask circuit configured to mask the inverted input when the mask input is de-asserted;
a charge controller defining a feedback input and a transition input, the feedback input coupled to the feedback terminal, and the transition input coupled to the mask output;
the charge controller is configured to, during periods of time when the polarity is positive, assert the low terminal responsive to assertion of the mask output; and
the charge controller is configured to, during periods of time when the polarity is negative, assert the high terminal responsive to assertion of the mask output.

20. The bridgeless PFC converter of claim 19 wherein:
during periods of time when the polarity is positive, the charge controller is further configured to, responsive to assertion of the mask output:
assert the low terminal; and then
monitor a signal indicative of inductor current on the winding sense terminal; and when the signal indicative of inductor current reaches a predetermined threshold
assert the high terminal and de-assert the low terminal;
during periods of time when the polarity is negative, the charge controller is further configured to, responsive to assertion of the mask output:
assert the high terminal; and then
monitor the signal indicative of inductor current on the winding sense terminal; and when the signal indicative of inductor current reaches the predetermined threshold
de-assert the high terminal and assert the low terminal.

* * * * *